(12) United States Patent
Ryu et al.

(10) Patent No.: US 6,440,897 B1
(45) Date of Patent: Aug. 27, 2002

(54) THERMALLY SENSITIVE RECORDING MEDIUM

(75) Inventors: Yukiko Ryu; Takashi Date; Reiji Ohashi, all of Kita-ku (JP)

(73) Assignee: Nippon Paper Industries Co Ltd, Tokyo (JP)

(*) Notice: Subject to any disclaimer, the term of this patent is extended or adjusted under 35 U.S.C. 154(b) by 0 days.

(21) Appl. No.: 09/418,821

(22) Filed: Oct. 15, 1999

(30) Foreign Application Priority Data

Oct. 16, 1998 (JP) ............................................. 10-295845
May 28, 1999 (JP) ............................................. 11-150671

(51) Int. Cl.$^7$ ............................. B41M 5/30; B41M 5/40
(52) U.S. Cl. ........................................ 503/209; 503/226
(58) Field of Search .................................. 503/209, 226

(56) References Cited

U.S. PATENT DOCUMENTS

| | | | |
|---|---|---|---|
| 4,446,262 A | 5/1984 | Okumura et al. | .............. 524/89 |
| 5,560,852 A | 10/1996 | Mura | .......................... 424/402 |

FOREIGN PATENT DOCUMENTS

| | | |
|---|---|---|
| EP | 0-068-327 A1 | 1/1983 |
| EP | 0-767-074 A2 | 4/1997 |
| EP | 0-826-511 A1 | 3/1998 |

OTHER PUBLICATIONS

Japanese Patent Laid–Open Publication No. 5–195367 published Aug. 3, 1993 (Abstract).
Japanese Patent Laid–Open Publication No. 5–230346 published Sep. 9, 1993 (Abstract).

*Primary Examiner*—Bruce H. Hess
(74) *Attorney, Agent, or Firm*—Sherman & Shalloway

(57) ABSTRACT

The present invention is a thermally sensitive recording medium which has excellent anti ultra violet ray property, mainly composed of an electron donating compound and an electron accepting compound, containing at least one of benzoxadinone compound represented by general formula (1) as an ultra violet ray absorbing agent.

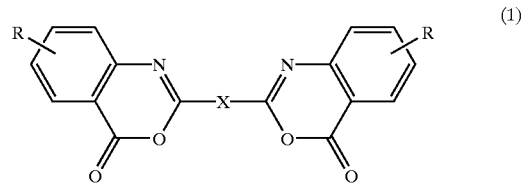

(1)

In the above mentioned formula, R represents hydrogen atom, hydroxyl group, alkyl group of carbon number 1–8, alkoxy group of carbon number 1–6, acyl group of carbon number 1–6, acyloxy group of carbon number 1–6, alkoxy carbonyl group of carbon number 1–6, carboxyl group, halogen atom or nitro group and X represents a divalent group or a direct bond.

8 Claims, No Drawings

THERMALLY SENSITIVE RECORDING MEDIUM

BACKGROUND OF THE INVENTION

The present invention relates to a thermally sensitive recording medium which uses benzoxazinone compound as an ultraviolet ray absorbing agent.

DESCRIPTION OF THE PRIOR ART

Generally, in a thermally sensitive recording method, a recording image is obtained by following procedure. A thermally sensitive layer mainly composed by colorless or pale colored dye precursor which is ordinarily an electron donating compound and a color developer which is an electron accepting compound is prepared on a substrate, and a recording image is developed by an instantaneous chemical reaction caused by heating said layer using a thermal head, a thermal pen or a laser beam. And these techniques are disclosed in Japanese Patent Publication 43-4160 and in Japanese Patent Publication 45-14039. These thermally sensitive recording media do not need procedures for development and fixing, and very clear image can be obtained by a simple apparatus. And, the apparatus is not only relatively cheap and compact, but also has merits of easy maintenance and does not generate noise, and, therefore, is widely used to a measuring recorder, a thermal printer of computer, a facsimile, an automatic ticket vendor or a bar cord labeler.

As an use of this thermally sensitive recording media, recently the use for an indication media such as an indicating label or a poster is becoming more popular. However, this kind of thermally sensitive recording media does not have good stability against light and heat. Therefore, when the thermally sensitive recording media is exposed to indoor light or sun light, or kept at higher temperature for long term, the ground color changes to yellowish color and the appearance is deteriorated, further the stability of the recorded medium is spoiled. Consequently the qualitative image of the thermally sensitive recording medium is affected.

To prevent the ground color from changing into yellowish color, various methods which add fine ground particles of an ultra violet ray absorbing agent to a color developing layer or to a protecting layer are published (for example, Japanese Patent Laid Open Publication 50-104650, Japanese Patent Laid Open Publication 55-55891, Japanese Patent Laid Open Publication 55-93492 and Japanese Patent Laid Open Publication 58-87093). However, in a case of this method which obtains sufficient light resistance by adding fine ground particles of an ultra violet ray absorbing agent to the thermally sensitive recording layer, it is necessary to add large amount of fine ground particles of an ultra violet ray absorbing agent, because the ultra violet ray absorbing efficiency of and the shading efficiency of it are poor. When this kind of thermally sensitive recording medium is kept under the high temperature condition, the new problems such as a background fogging or deterioration of recorded density is caused, and the property as the thermally sensitive recording medium is spoiled.

Further, when fine ground particles of ultra violet ray absorbing agent is contained in a protecting layer, and if the ultra violet ray absorbing agents are conventional type, these agents have low melting point and can be easily molten by the heat of the thermal head, and cause the problem of fine refuse or sticking which spoil the thermal head by long term printing. Furthermore, the ultra violet ray absorbing agent is extracted from the protecting layer by the effect of plasticizer or oil, and consequently, the preserving ability of the recorded image is deteriorated.

In Japanese Patent 61-57198, a method to add an ultra violet ray absorbing agent which is made water soluble by introducing sodium sulfonate group to the thermally sensitive recording layer and/or protecting layer is proposed. However, this method not only has a problem affecting pH or fluidity of solution at the production, but also causes problems of ground color developing and the thermal head spoiling. This method can not be said as a practical method.

Further, the method to obtain a thermally sensitive recording medium which has good preserving stability and light resistance by containing micro capsules of ultra violet ray absorbing agent is disclosed in Japanese Patent Laid Open Publication 5-155134. However, in this method, the preparation of micro capsule in which fine particles of ultra violet ray absorbing agent are immobilized is necessary, and to improve the absorbing efficiency of ultra violet ray, it is necessary to make the size of micro capsule smaller, however, the size of micro capsule is restricted by the preparation method. Therefore, for the generation of sufficient light resistance, the necessary amount of the micro capsules that contain ultra violet ray absorber is increased and the cost of the thermally sensitive recording raises. Further, since the micro capsule in which ultra violet absorbing agent is immobilized is necessary to be stabilized to heat and pressure, the wall thickness of micro capsule must be thicker, and it is a ground of cost raising.

Recently, a thermally sensitive recording medium which uses an ultra violet absorbing agent prepared by polymerization of benzotriazol molecule or benzophenone molecule which has an ultra violet ray absorbing ability, is proposed in Japanese Patent Laid Open Publication 7-314894, Japanese Patent Laid Open Publication 9-221487, Japanese Patent Laid Open Publication 9-268183, Japanese Patent Laid Open Publication 9-314496, Japanese Patent Laid Open Publication 10-71770 and Japanese Patent Laid Open Publication 10-36371. But, the improvement effect for refuse and sticking by use of the compounds disclosed in these documents is not sufficient.

As mentioned above, the method to provide a light resistance to a thermally sensitive recording medium by an ultra violet absorbing agent has been carried out for long time, however, a sufficient method is not yet developed.

BRIEF SUMMARY OF THE INVENTION

The object of the invention is to provide a thermally sensitive recording medium which has a good light resistance at the recording part and the ground part, a good runnability, further, which is good at image preservation ability concretely resistance to plasticizer, oil or solvent, without spoiling basic property of thermally sensitive recording medium.

The inventors of the present invention have conducted an intensive study and have found that the thermally sensitive recording medium which has a good resistance to light of recording part and a good resistance to yellowish color change of ground part can be obtained by using benzoxazinone compound represented by following general formula (1) as an ultra violet ray absorbing agent to a thermally sensitive recording medium which applies color developing reaction between electron donating compound and electron accepting compound.

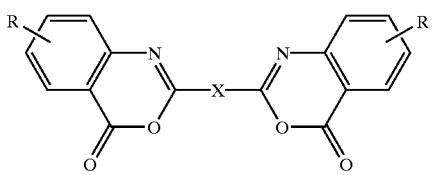

(1)

In the formula, R represents hydrogen atom, hydroxyl group, alkyl group of carbon number 1–8, alkoxy group of carbon number 1–6, acyl group of carbon number 1–6, acyloxy group of carbon number 1–6, alkoxy carbonyl group of carbon number 1–6, carboxyl group, halogen atom or nitro group. Especially, hydrogen atom, hydroxyl group, alkyl group of carbon number 1–4, alkoxy group of carbon number 1–4, acyl group of carbon number 1–4, alkoxy carbonyl group of carbon number 1–4 or halogen atom are desirable. X represents a divalent group or a direct bond, and desirably is an aromatic hydro carbon of carbon number 6–12.

Additionally, the inventors of this invention have found that the following problems which occur when conventional ultra violet ray absorbing agent is used can be prevented by use of benzoxadinone compound of this invention. That is, the ground color imperfection when blended in the recording layer, the deterioration of running recording ability by the generation of refuse and sticking when blended in the protecting layer and the deterioration of resistance to plasticizer or oil can be prevented.

The benzoxadinone compound of this invention is not easily molten by heating with a thermal sensitive head, because the compound has a high melting point. Therefore, the thermal sensitive recording medium which contains the compound of this invention can prevent perfectly the generation of refuse and sticking. Further, the solubility of benzoxadinone compound of this invention is very poor. Therefore, the thermally sensitive recording medium containing the compound of this invention has an advantage that when it is contacted with plasticizer or oil, said compound does not ooze out from the protecting layer.

DETAILED DESCRIPTION OF THE INVENTION

The benzoxadinone compound represented by above mentioned general formula (1) can be prepared by well known synthetic method, for example by the method disclosed in Japanese Patent Laid Open Publication 58-194854. Namely, anthranitic acid derivatives represented by following general formula (2) and halogenated dicarboxylic acid represented by following general formula (3) are stirred or heated and stirred with refluxing together with in the aqueous solution of inorganic alkaline compound such as sodium carbonate for several minutes or several hours at room temperature, and bisamidecarboxylic acid is obtained. The obtained compound is reacted with acetic anhydride, then benzoxadinone compound represented by above mentioned general formula (1) can be prepared.

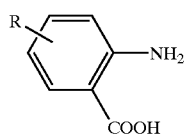

(2)

In the formula, R represents hydrogen atom, hydroxyl group, alkyl group of carbon number 1–8, alkoxy group of carbon number. 1–6, acyl group of carbon number 1–6, acyloxy group of carbon number 1–6, alkoxy carbonyl group of carbon number 1–6, carboxyl group, halogen atom or nitro group. Especially, hydrogen atom, hydroxyl group, alkyl group of carbon number 1–4, alkoxy group of carbon number 1–4, acyl group of carbon number 1–4, alkoxy carbonyl group of carbon number 1–4 or halogen atom are desirable.

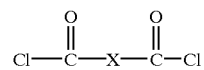

(3)

In the above mentioned general formula, X represents a divalent group or a direct bond, and is desirably an aromatic hydrocarbon of carbon number 6–12.

As the concrete example of benzoxazinone compound represented by above mentioned general formula (1), following compounds can be mentioned, however not intended to be limited to them, and these compounds can be used alone or together.

2,2'-bis(4H-3,1-benzoxazin-4-one),
2,2'-bis(4H-6-hydroxy-3,1-benzoxazin-4-one),
2,2'-bis(4H-6-methyl-3,1-benzoxazin-4-one),
2,2'-bis(4H-6-ethyl-3,1-benzoxazin-4-one),
2,2'-bis(4H-6-propyl-3,1-benzoxazin-4-one),
2,2'-bis(4H-6-methoxy-3,1-benzoxazin-4-one),
2,2'-bis(4H-6-acethyl-3,1-benzoxazin-4-one),
2,2'-bis(4H-6-propionyl-3,1-benzoxazin-4-one),
2,2'-bis(4H-6-acetoxy-3,1-benzoxazin-4-one),
2,2'-bis(4H-6-chloro-3,1-benzoxazin-4-one),
2,2'-bis(4H-7-chloro-3,1-benzoxazin-4-one),
2,2'-bis(4H-6-bromo-3,1-benzoxazin-4-one),
2,2'-bis(4H-6-iodo-3,1-benzoxazin-4-one),
2,2'-bis(4H-6-nitro-3,1-benzoxazin-4-one),
2,2'-bis(4H-6-carboxy-3,1-benzoxazin-4-one),
2,2'-p-phenylenebis(4H-3,1-benzoxazin-4-one),
2,2'-p-phenylenebis(4H-6-hydroxy-3,1-benzoxazin-4-one),
2,2'-p-phenylenebis(4H-6-methyl-3,1-benzoxazin-4-one),
2,2'-p-phenylenebis(4H-6-ethyl-3,1-benzoxazin-4-one),
2,2'-p-phenylenebis(4H-6-propyl-3,1-benzoxazin-4-one),
2,2'-p-phenylenebis(4H-6-methoxy-3,1-benzoxazin-4-one),
2,2'-p-phenylenebis(4H-6-ethoxy-3,1-benzoxazin-4-one),
2,2'-p-phenylenebis(4H-6-acethyl-3,1-benzoxazin-4-one),
2,2'-p-phenylenebis(4H-6-propionyl-3,1-benzoxazin-4-one),
2,2'-p-phenylenebis(4H-6-acetoxy-3,1-benzoxazin-4-one),
2,2'-p-phenylenebis(4H-6-chloro-3,1-benzoxazin-4-one),
2,2'-p-phenylenebis(4H-7-chloro-3,1-benzoxazin-4-one),
2,2'-p-phenylenebis(4H-6-bromo-3,1-benzoxazin-4-one),
2,2'-p-phenylenebis(4H-6-iodo-3,1-benzoxazin-4-one),
2,2'-p-phenylenebis(4H-6-nitro-3,1-benzoxazin-4-one),
2,2'-p-phenylenebis(4H-7-methoxycarbonyl-3,1-benzoxazin-4-one),
2,2'-p-phenylenebis(4H-7-carboxy-3,1-benzoxazin-4-one),
2,2'-(2,6-naphthylene)bis(4H-3,1-benzoxazin-4-one), 2,2'-(2,6-naphthylene)bis(4H-6-hydroxy-3,1-benzoxazin-4-one),
2,2'-(2,6-naphthylene)bis(4H-6-methyl-3,1-benzoxazin-4-one),
2,2'-(2,6-naphthylene)bis(4H-6-ethyl-3,1-benzoxazin-4-one),
2,2'-(2,6-naphthylene)bis(4H-6-methoxy-3,1-benzoxazin-4-one),
2,2'-(2,6-naphthylene)bis(4H-6-ethoxy-3,1-benzoxazin-4-one),
2,2'-(2,6-naphthylene)bis(4H-6-acetyl-3,1-benzoxazin-4-one),
2,2'-(2,6-naphthylene)bis(4H-6-propionyl-3,1-benzoxazin-4-one),
2,2'-(2,6-naphthylene)bis(4H-6-acetoxy-3,1-benzoxazin-4-one),
2,2'-(2,6-naphthylene)bis(4H-6-chloro-3,1-benzoxazin-4-one),
2,2'-(2,6-naphthylene)bis(4H-7-chloro-3,1-benzoxazin-4-one),
2,2'-(2,6-naphthylene)bis(4H-6-bromo-3,1-benzoxazin-4-one),
2,2'-(2,6-naphthylene)bis(4H-6-iodo-3,1-benzoxazin-4-one),
2,2'-(2,6-naphthylene)bis(4H-6-nitro-3,1-benzoxazin-4-one),
2,2'-(2,6-naphthylene)bis(4H-6-carboxy-3,1-benzoxazin-4-one),
2,2'-(4,4'-biphenylene)bis(4H-3,1-benzoxazin-4-one),
2,2'-(4,4'-biphenylene)bis(4H-6-hydroxy-3,1-benzoxazin-4-one),
2,2'-(4,4'-biphenylene)bis(4H-6-methyl-3,1-benzoxazin-4-one),
2,2'-(4,4'-biphenylene)bis(4H-6-ethyl-3,1-benzoxazine-4-one),
2,2'-(4,4'-biphenylene)bis(4H-6-methoxy-3,1-benzoxazine-4-one),
2,2'-(4,4'-biphenylene)bis(4H-6-ethoxy-3,1-benzoxazine-4-one),
2,2'-(4,4'-biphenylene)bis(4H-6-acetyl-3,1-benzoxazine-4-one),
2,2'-(4,4'-biphenylene)bis(4H-6-propionyl-3,1-benzoxazine-4-one),
2,2'-(4,4'-biphenylene)bis(4H-6-acetoxy-3,1-benzoxazine-4-one),
2,2'-(4,4'-biphenylene)bis(4H-6-chloro-3,1-benzoxazine-4-one),
2,2'-(4,4'-biphenylene)bis(4H-7-chloro-3,1-benzoxazine-4-one),
2,2'-(4,4'-biphenylene)bis(4H-6-bromo-3,1-benzoxazin-4-one),
2,2'-(4,4'-biphenylene)bis(4H-6-iodo-3,1-benzoxazin-4-one),
2,2'-(4,4'-biphenylene)bis(4H-6-nitro-3,1-benzoxazin-4-one),
2,2'-(4,4'-biphenylene)bis(4H-6-carboxy-3,1-benzoxazin-4-one),
2,2'-ethylenebis(4H-3,1-benzoxazin-4-one),
2,2'-ethylenebis(4H-6-hydroxy-3,1-benzoxazin-4-one),
2,2'-ethylenebis(4H-6-methyl-3,1-benzoxazin-4-one),
2,2'-ethylenebis(4H-6-ethyl-3,1-benzoxazin-4-one),
2,2'-ethylenebis(4H-6-propyl-3,1-benzoxazin-4-one),
2,2'-ethylenebis(4H-6-methoxy-3,1-benzoxazin-4-one),
2,2'-ethylenebis(4H-6-acetyl-3,1-benzoxazin-4-one),
2,2'-ethylenebis(4H-6-propionyl-3,1-benzoxazin-4-one),
2,2'-ethylenebis(4H-6-acetoxy-3,1-benzoxazin-4-one),
2,2'-ethylenebis(4H-6-chloro-3,1-benzoxazin-4-one),
2,2'-ethylenebis(4H-7-chloro-3,1-benzoxazin-4-one),
2,2'-ethylenebis(4H-6-bromo-3,1-benzoxazin-4-one),
2,2'-ethylenebis(4H-6-iodo-3,1-benzoxazin-4-one),
2,2'-ethylenebis(4H-6-nitro-3,1-benzoxazin-4-one),
2,2'-ethylenebis(4H-6-carboxy-3,1-benzoxazin-4-one),
2,2'-propylenebis(4H-3,1-benzoxazin-4-one),
2,2'-propylenebis(4H-6-hydroxy-3,1-benzoxazin-4-one),
2,2'-propylenebis(4H-6-methyl-3,1-benzoxazin-4-one),
2,2'-propylenebis(4H-6-ethyl-3,1-benzoxazin-4-one),
2,2'-propylenebis(4H-6-propyl-3,1-benzoxazin-4-one),
2,2'-propylenebis(4H-6-methoxy-3,1-benzoxazin-4-one),
2,2'-propylenebis(4H-6-ethoxy-3,1-benzoxazin-4-one),
2,2'-propylenebis(4H-6-acetyl-3,1-benzoxazin-4-one),
2,2'-propylenebis(4H-6-propionyl-3,1-benzoxazin-4-one),
2,2'-propylenebis(4H-6-acetoxy-3,1-benzoxazin-4-one),
2,2'-propylenebis(4H-6-chloro-3,1-benzoxazin-4-one),
2,2'-propylenebis(4H-7-chloro-3,1-benzoxazin-4-one),
2,2'-propylenebis(4H-6-bromo-3,1-benzoxazin-4-one),
2,2'-propylenebis(4H-6-iodo-3,1-benzoxazin-4-one),
2,2'-propylenebis(4H-6-nitro-7-cloro-3,1-benzoxazin-4-one)
2,2'-propylenebis(4H-6-carboxy-7-cloro-3,1-benzoxazin-4-one)
2,2'-cyclohexylenebis(4H-6-hydroxy-3,1-benzoxazin-4-one),
2,2'-cyclohexylenebis(4H-6-methyl-3,1-benzoxazin-4-one),
2,2'-cyclohexylenebis(4H-6-ethyl-3,1-benzoxazin-4-one),
2,2'-cyclohexylenebis(4H-6-methoxy-3,1-benzoxazin-4-one),
2,2'-cyclohexylenebis(4H-6-ethoxy-3,1-benzoxazin-4-one),
2,2'-cyclohexylenebis(4H-6-acetyl-3,1-benzoxazin-4-one),
2,2'-cyclohexylenebis(4H-6-propionyl-3,1-benzoxazin-4-one),
2,2'-cyclohexylenebis(4H-6-acetoxy-3,1-benzoxazin-4-one),
2,2'-cyclohexylenebis(4H-6-cloro-3,1-benzoxazin-4-one),
2,2'-cyclohexylenebis(4H-6-bromo-3,1-benzoxazin-4-one),
2,2'-cyclohexylenebis(4H-6-iodo-3,1-benzoxazin-4-one),
2,2'-cyclohexylenebis(4H-6-carboxy-3,1-benzoxazin-4-one), and
2,2'-cyclohexylenebis(4H-6-nitro-3,1-benzoxazin-4-one) can be mentioned. Especially, from the view point of ultra violet absorbing effect, and ease of synthesis, 2,2'-p-phenylenebis(4H-3,1-benzoxazin-4-one) is desirably used.

The application of the benzoxadinone compound obtained as above to the thermally sensitive recording medium is illustrated.

In general, a thermally sensitive recording medium can be obtained by preparing a thermally recording layer containing electron donating compound and electron accepting compound on a substrate. In the present invention, it is possible to accumulate a laminated protecting layer composed mainly of water soluble or water dispersible binder on a thermally recording layer, an intermediate layer between said thermally sensitive recording layer and said protecting layer, an undercoating layer mainly composed of filler and binder between substrate and said thermally sensitive recording layer, and a back coating layer at the reverse side of substrate. The combination of structure which composes said accumulated laminate layer can be voluntarily changed according to the required quality level, and conventional well-known techniques in the thermally sensitive recording medium field can be applied. The important point of the thermally sensitive recording medium of this invention is to contain at least one benzoxadinone compound represented by said general formula (1) in one layer of above mentioned layers. By use of said benzoxadinone compound, the resistance to light of recording part and ground part of thermally sensitive recording medium are remarkably improved. Especially, from the view point of absorbing and shading effect for ultra violet ray, it is desirable to prepare a protecting layer on the thermally sensitive recording layer and to add the compound of this invention to this layer.

Further, the benzoxadinone compound of this invention has a good stability at high temperature, does not generate fine refuse and does not cause a sticking problem by melting, and therefore, good runnability can be obtained.

When the benzoxadinone compound of this invention is blended to a thermally sensitive recording layer, the background fogging of recording part at high temperature condition is very small. And when the compound of this invention is blended to a protecting layer, since the compound is not dissolved in plasticizer, oil or organic solvent, even if the surface of the protecting layer is contacted to organic solvents, the deterioration of barrier function caused by oozing out of the ultra violet ray absorbing agent is not observed. That is, the remarkable improvement effect can be obtained on the preserving ability of image.

When the benzoxadinone compound of this invention is used to the thermally sensitive recording medium, it is desirable that the average particle size of the benzoxadinone compound is smaller than 2 µm to obtain a desired effect, and more desirably to be smaller than 0.5 µm. When the average particle size is smaller than 0.5 µm, not only the ultra violet ray absorbing effect is remarkably improved, but also more clear recorded image can be obtained, because the recorded image is not shaded if the compound is contained in the protecting layer.

As the method to grind the average particle size of benzoxadinone compound of this invention, a following method can be mentioned. That is, in general, water is used as the dispersing medium and dispersing agent and defoaming agent are added at need, then ground by stirring and pulverized by a ball mill, an attriter or a sand grinder. Especially, a sand grinder is preferably used, and the desirable average particle size of dispersed medium is smaller than 1 mm.

The benzoxadinone compound of this invention can be used together with other kinds of well known ultra violet ray absorbing agent as long as it does not hurt the desired effect to the present invention. Further, it is desirable to use an ultra violet absorbing agent such as,
nickel bis(octylphenyl)sulfide,
[2,2'-tiobis(4-tert-octylphenolate)]-n-butylamine nickel,
nickelcomplex-3,5'-di-tert-butyl-4-hydroxybenzyl-phosphoric acid monoethylate,
nickel dibutyldithiocarbamate and
benzoate type quencher, or
hindered amine type light stabilizer such as,
bis(2,2,6,6-tetramethyl-4-piperidyl)sebacate can be used together with the benzoxadinone compound.

As the thermally sensitive recording method which uses an electron donating compound and an electron accepting compound, for example, a combination of dye precursor and color developer, diazonium salt and coupler, transition element such as iron and chelate compound, aromatic isocyanate compound and imino compound can be mentioned. Since the combination of dye precursor and color developer gives excellent result to the color density and recording sensitivity, the thermally sensitive recording medium which uses color developing reaction between dye precursor and color developing agent is illustrated in detail below.

As the dye precursor which is used in this invention, various kinds of well known compounds can be used. These compounds can be used alone or together, and preferably selected according to the intended use and the required properties. Concrete examples are mentioned below, however, it is not intended to be limited to them. Mark in bracket parenthesis indicates commercialized name.

(1) Triarylmethane compound
3,3'-bis(4-dimethylaminophenyl)-6-dimethylaminophthalide, [crystalvioletlactone, CVL]
3-(4-dimethylamino-2-methylphenyl)-3-(4-dimethylaminophenyl)phthalide,
3,3'-bis(2-(4-dimethylaminophenyl)-2-(4-methoxyphenyl)ethenyl)-4,5,6,7-tetrachlorophthalide [NIR-Black],
3,3'-bis(4-dimethylaminophenyl)phthalide [MGL],
3-(4-dimethylaminophenyl)-3-(1,2-dimethylindol-3-yl)phthalide,
3-(4-dimethylaminophenyl)-3-(2-phenylindol-3-yl)phthalide,
3,3'-bis(4-ethylcarbazol-3-yl)-3-dimethylaminophthalide,
3,3'-bis(1-ethyl-2-methylindol-3-yl)phthalide [Indolylred],
3,3'-bis(2-phenylindol-3-yl)-5-dimethylaminophthalide,
tris(4-dimethylaminophenyl)methane [LCV], can be mentioned.

(2) Diphenylmethane type compound
4,4-bis(dimethylamino)benzhydlylbenzylether,
N-halophenyl-leucoauramine and
N-2,4,5-trichlorophenylleucoauramine can be mentioned.

(3) Xanthene type compound
rhodamine B-anilinolactam,
3-diethylamino-7-dibenzylaminofluorane,
3-diethylamino-7-butylaminofluorane,
3-diethylamino-7-anilinofluorane [Green-2],
3-diethylamino-7-(2-cloroanilino)fluorane,
3-dibutylamino-7-(2-cloroanilino)fluorane [TH-107],
3-diethylamino-7-(3-trifluoromethylanilino)fluorane [Black-100],
3-diethylamino-6-methyl-7-anilinofluorane [ODB],
3-dibutylamino-6-methyl-7-anilinofluorane [ODB-2],
3-piperidino-6-methyl-7-anilinofluorane,
3-(N-isoamyl-N-ethylamino)-6-methyl-7-anilinofluorane [S-205],
3-(N-ethyl-N-tolylamino)-6-methyl-7-anilinofluorane,
3-(N-cyclohexyl-N-methylamino)-6-methyl-7-anilinofluorane [PSD-150],
3-diethylamino-6-chloro-7-(β-ethoxyethylamino)fluorane,
3-diethylamino-6-chloro-7-(γ-chloropropylamino)fluorane,
3-cyclohexylamino-6-chlorofluorane [OR-55],
3-diethylamino-6-chloro-7-anilinofluorane,
3-(N-cyclohexyl-N-methylamino)-6-methyl-7-anilinofluorane,
3-diethylamino-7-phenylfluorane can be mentioned.

(4) Thiazine type compound
benzoylleucomethyleneblue and
p-nitrobenzoylleucomethyleneblue can be mentioned.

(5) Spiro type compound
3-methylspirobinaphthopyrane,
3-methylspirobinaphthopyrane,
3-benzylspirobinaphthopyrane and
3-methylnaphtho-(6'-methoxybenzo)spiropyrane can be mentioned.

(6) Pentadiene type compound
1,1,5,5-tetrakis(4-dimethylaminophenyl)-3-methoxy-1,4-pentadiene and
1,1,5,5-tetrakis(4-dimethylaminophenyl)-1,4-pentadiene can be mentioned.

As the developer to be used in this invention, inorganic acidic compounds, such as activated clay, attapulgite, colloidal silica and aluminum silicate, and 4-hydroxybenzoic ester type such as
benzyl 4-hydroxybenzoate,
ethyl 4-hydroxybenzoate,
n-propyl 4-hydroxybenzoate,
isopropyl 4-hydroxybenzoate,
butyl 4-hydroxybenzoate,
4-hydroxy phthalic acid diester type such as,
dimethyl 4-hydroxy phthalate,
diisopropyl 4-hydroxy phthalate,
dibenzyl 4-hydroxy phthalate,
dihexyl 4-hydroxy phthalate,
phthalic monoester type such as,
monobenzyl phthalate,
monocyclohexyl phthalate,
monophenyl phthalate,
monomethylphenyl phthalate,
bishydroxyphenylsulfide type such as,
bis(4-hydroxy-3-tert-butyl-6-methylphenyl)sulfide,
bis(4-hydroxy-2,5-dimethylphenyl)sulfide,
bis(4-hydroxy-5-ethyl-2-metylphenyl)sulfide,
bisphenol type such as,
3,4-bisphenol A,
1,1-bis(4-hydroxyphenyl)ethane,
2,2-bis(4-hydroxyphenyl)propane [bisphenol A],
bis(4-hydroxyphenyl)methane [bisphenol F],
2,2-bis(4-hydroxyphenyl )hexane,
tetramethyl bisphenol A,
1,1-bis(4-hydroxyphenyl)-1-phenylethane,
1,4-bis(2-(4-hydroxyphenyl)propyl)benzene,
1,3-bis(2-(4-hydroxyphenyl)propyl)benzene,
1,4-bis(4-hydroxylphenyl)cyclohexane,
2,2'-bis-(4-hydroxy-3-isopropylphenyl)propane,
1,4-bis(1-(4-(2-(4-hydroxyphenyl)-2-propyl)phenyl)ethyl) benzene,
4-hydroxyphenylarylsulfone type such as,
4-hydroxy-4'-isopropoxydiphenylsulfone [D-8],
4-hydroxy-4-methoxydiphenylsulfone,
4-hydroxy-4'-n-propoxydiphenylsulfone,
bishydroxyphenylsulfone type such as,
bis(4-hydroxyphenyl)sulfone [bisphenol S],
tetramethylbisphenol S,
bis(3-ethyl-4-hydroxyphenyl)sulfone,
bis(3-propyl-4-hydroxyphenyl)sulfone,
bis(3-isopropyl-4-hydroxyphenyl)sulfone,
bis(3-tert-butyl-4-hydroxy-6-methylphenyl)sulfone,
bis(3-chloro-4-hydroxyphenyl)sulfone,
bis(3-bromo-4-hydroxyphenyl)sulfone,
2-hydroxyphenyl-4'-hydroxyphenylsulfone
4-hydroxyphenylarylsulfonate type such as,
4-hydroxybenzenesulfonate,
4-hydroxyphenyl-p-tolylsulfonate,
4-hydroxyphenyl-p-chlorobenzenesulfonate,
4-hydroxybenzoyloxybenzoic ester type such as,
benzyl 4-hydroxybenzoyloxybenzoate,
ethyl 4-hydroxybenzoyloxybenzoate,
n-propyl 4-hydroxybenzoyloxybenzoate,
isopropyl 4-hydroxybenzoyloxybenzoate,
butyl 4-hydroxybenzoyloxybenzoate,
benzophenone type such as,
2,4-dihydroxybenzophenone,
α,α'-bis-(3-methyl-4-hydroxyphenyl)-m-diisopropylbenzophenone,
2,3,4,4'-tetrahydroxybenzophenone,
phenolic compound such as,
N-stearyl-p-aminophenol,
4-hydroxysalicylanilide,
4,4'-dihydroxydiphenylether,
n-butyl-bis(hydroxyphenyl)acetate,
α,α',α"-tris-(4-hydroxyphenyl)-1,3,5-triisopropylbenzene,
stearyl gallate,
4,4'-thiobis(6-t-butyl-m-cresol),
2,2-bis(3-allyl-4-hydroxyphenyl)sulfone,
bis(4-hydroxyphenyl)sulfide,
bis(4-hydroxy-3-methylphenyl)sulfide,
p-tert-butylphenol,
p-phenylphenol,
p-benzylphenol,
1-naphthol,
2-naphthol
thio urea compound such as,
N,N'-di-m-chlorophenylthiourea,
aromatic carboxylic acid such as,
benzoic acid,
p-tert-butyl benzoic acid,
trichloro benzoic acid,
3-sec-butyl-4-hydroxy benzoic acid,
3-cyclohexyl-4-hydroxy benzoic acid,
3,5-dimethyl-4-hydroxy benzoic acid,
terephthalic acid,
salicylic acid,
3-isopropylsalicylic acid,
3-tert-butylsalicylic acid,
4-(2-(p-methoxyphenoxy)ethyloxy)salicylic acid,
4-(3-(p-tolylsulfonyl)propyloxy)salicylic acid and
5-(p-(2-(p-methoxyphenoxy)ethoxy)cumyl)salicylic acid,
and a metallic salt of these aromatic carboxylic acids with polyvalent metal such as zinc, magnesium, aluminum, calcium, titanium, manganese, tin or nickel, further, an organic acidic compound such as, antipyryne complex of zinc thiocyanate and complex zinc salt of terephthalaldehydic acid with other aromatic carboxylic acid can be mentioned. These compounds can be used alone or can be used together.

In general, in a thermally sensitive recording medium, for the purpose of improving sensitivity, a sensitizer is used. In the thermally sensitive recording medium of this invention, a sensitizer can be added to the thermally sensitive recording layer as needed. The concrete examples are mentioned below, however, it is not intended to be limited to them. These sensitizers can be used alone, or used together.
stearamide,
methoxycarbonyl-N-stearamide,
N-benzoyl stearamide,
N-eicosamide,
Ethylenebis stearamide,
behenamide,
methylenebis stearamide,
methylolamide,
N-methylol stearamide,
dibenzyl terephthalate,
dimethyl terephthalate,
dioctyl terephthalate,
benzyl p-benzyloxybenzoate,
phenyl 1-hydroxy-2-naphthoate,
dibenzyl oxalate,
di-p-methylbenzyl oxalate,
di-p-chlorobenzyl oxalate,
2-naphthylbenzylether,
m-tarphenyl,
p-benzylbiphenyl,
tolylbiphenylether,
di(p-methoxyphenoxyethyl)ether,
1,2-di(3-methylphenoxy)ethane,
1,2-di(4-methylphenoxy)ethane, 1,2-di(4-methoxyphenoxy)ethane,
1,2-di(4-chlorophenoxy)ethane,
1,2-diphenoxyethane,
1-(4-methoxyphenoxy)-2-(2-methylphenoxy)ethane,
p-methylthiophenylbenzylether,
1,4-di(phenylthio)butane,
p-acetotoluidide,
p-acetophenetidide,
N-acetoacetyl-p-toluidine,
di(biphenylethoxy)benzene,
p-di(vinyloxyethoxy)benzene and
1-isopropylphenyl-2-phenylethan can be mentioned.

In general, 0.1–10 weight parts of sensitizer can be used to 1 weight part of dye precursor.

To the thermally sensitive recording medium of this invention, a preserving stabilizer can be added for the stabilization at the preservation. As the concrete example of the preserving stabilizer, hindered phenol compound such as
1,1,3-tris(2-methyl-4-hydroxy-5-tert-butylphenyl)butane,
1,1,3-tris(2-methyl-4-hydroxy-5-cyclohexylphenyl)butane,
4,4'-butylidenebis(2-tert-butyl-5-methylphenol),
4,4'-thiobis(2-tert-butyl-5-methylphenol),
2,2'-thiobis(6-tert-butyl-4-methylphenol) and
2,2'-methylenebis(6-tert-butyl-4-methylphenol),
4-benzyloxy-4'-(2-methylglycidyloxy)diphenylsulfone and
  sodium-2,2'-methylenebis(4,6-di-tert-butylphenyl)
  phosphate can be mentioned.

In general, 0.1–10 weight parts of these preserving stabilizer can be used to 1 weight part of dye precursor.

As the concrete example of a binder to be added to each layer, water soluble binder such as
starch,
hydroxyethyl cellulose,
methylcellulose,
carboxymethyl cellulose,
gelatine,
casein,
acacia,
polyvinyl alcohol,
carboxy modified polyvinyl alcohol,
acetoacetyl group modified polyvinyl alcohol,
silicon modified polyvinyl alcohol,
isobutylene-maleic anhydride copolymer alkaline salt,
styrene-maleic anhydride copolymer alkaline salt,
ethylene-maleic anhydride copolymer alkaline salt and
styrene-acrylic acid copolymer alkaline salt,
latex such as
styrene-butadiene copolymer, acrylonitrile-butadiene copolymer and
methylacrylate-butadiene copolymer,
water dispersion binder such as
urea resin, melamine resin, amide resin and polyurethane resin can be mentioned.

At least one kind of these binders can be used in the region of 15–80 weight % to the total amount of solid of thermally sensitive recording layer, protecting layer, intermediate layer and under layer.

As a filler an inorganic filler such as activated clay, clay, calcinated clay, diatomaceous earth, talc, kaolin, calcinated kaolin, calcium carbonate, magnesium carbonate, barium carbonate, titanium oxide, zinc oxide, silicon oxide or aluminum hydroxide and organic filler such as urea-formadehyde resin, polystyrene resin and phenol resin can be used.

To prevent the worn out of head and sticking, a thermal soluble substance can be added. As the concrete example, animal wax such as bees wax or shellac wax, vegetable wax such as carnauba wax, mineral wax such as montan wax, petroleum wax such as microlite waxs, higher fatty acid amide such as higher fatty acid polyhydric alcohol ester and stearamide, higher fatty acid metal salt such as zinc stearate or calcium stearate, synthetic wax such as higher amine, condensed product of fatty acid and amine, condensed product of aromatic and amine, synthetic paraffin such as chlorinated paraffin, paraffin oxide, higher chain glycol, 3,4-epoxyhexahydrodialkyl phthalate, polyethylene or polyethylene oxide can be mentioned.

Further, a dispersing agent such as sodium dioctylsulfosuccinate, a surface active detergent, a defoaming agent, a fluorescent brightening agent, a water proof agent and a slipping agent can be added at need.

As a substrate of the thermally sensitive recording medium, paper such as high quality paper, middle quality paper and coated paper can be mainly used, and various kinds of nonwoven cloth, plastic film, synthetic paper and metal foil can be used, further the complex sheet of these materials can be used voluntarily.

The thermally sensitive recording medium of this invention can be prepared by use of above mentioned materials by a conventional well known method. The preparation method of a coating for each layer of thermally sensitive recording medium is not restricted, and in general, water is used as a dispersing medium, a binder and filler or slipping agent which is added at need are added to benzoxadinone compound of this invention and mixed and stirred, thus the coating can be prepared.

A method to obtain aqueous coating by mixing dispersions containing a dye precursor or a color developing agent which are prepared separately using a sand grinder, an attriter or a ball mill, or a method to obtain an aqueous coating after dye precursor or color developing agent is immobilized in micro capsule are well known. The mixing ratio of dye precursor and color developer is decided according to the kind of dye precursor and color developer and not restricted, however, 1–50 weight parts, desirably 2–10 weight parts of color developer to 1 part of dye precursor is used.

The ratio of the benzoxadinone compound of this invention to be contained is desirably 1–50 wt %, more desirably 10–40 wt % to the total amount of solid of thermally sensitive recording layer, protecting layer, intermediate layer and under coating layer. When the amount of the compound is smaller than 1 wt % to the total amount of solid, the light resistance of recording part and ground part is remarkably deteriorated, and when the amount is bigger than 50 wt %, the viscosity of coating increases by aging and is not suited as a coating. When the compound is contained in a protecting layer, if the ratio is bigger than 50 wt %, the film forming ability of the protecting layer is affected and the image preservability is remarkably deteriorated.

The forming method of each layer of the thermally sensitive recording medium is not restricted, and an air knife coating, a Vali bar blade coating, a pure blade coating, a rod blade coating, a Shore-dwell coating, a curtain coating and a dye coating can be used. For example, the coating for a thermally sensitive recording layer is coated over the surface of the substrate and dried up, then the coating for a protecting layer is coated over the thermally sensitive recording layer and dried up. The coating amount of the coating for a thermally sensitive recording layer is 2–12 g/m$^2$, desirably 3–10 g/m$^2$ by dry weight, and the coating amount for an intermediate layer or a protecting layer is 0.1–15 g/m$^2$, desirably 0.5–7 g/m$^2$ by dry weight.

Further, it is possible to prepare a back coating layer at the back surface of the substrate of the thermally sensitive recording medium of this invention to improve the preserving ability. And after each layer is formed, the treatment to obtain flatness such as super calendar can be carried out, or adhesion can be mounted over the back surface of the thermally sensitive recording medium to prepare a adhesive label. Furthermore, a various well known technique such as magnetic thermally sensitive layer, printing coating layer or thermally transferring recording layer can be applied to this invention.

The present invention will be illustrated more clearly by Examples, however, it is not intended to be limited to them. In the Examples and Comparative Examples, "parts" and "%" indicates weight parts and wt %.

<Preparation of Thermally Sensitive Recording Medium>

EXAMPLE 1

(1) Preparation of a Thermally Sensitive Recording Layer

| A solution (dispersion of color developer) | |
|---|---|
| 4-hydroxy-4'-isopropoxydiphenylsulfone | 6.0 parts |
| 10% aqueous solution of polyvinyl alcohol | 20.0 parts |
| water | 17.0 parts |

The mixture of above mentioned compounds is ground to average particles diameter of 1 $\mu$m by a sand grinder.

| B solution (dispersion of dye) | |
|---|---|
| 3-dibutylamino-6-methyl-7-anilinofluorane | 3.0 parts |
| 10% aqueous solution of polyvinyl alcohol | 5.0 parts |
| water | 2.0 parts |

The mixture of above mentioned compounds is ground to average particles diameter of 1 $\mu$m by a sand grinder. Then the dispersions are mixed by following ratio and the coating is prepared.

| A solution | 43.0 parts |
|---|---|
| B solution | 10.0 parts |
| 30% aqueous dispersion of kaolin clay | 10.0 parts |

The prepared coating is coated over the one side surface of 50 g/m² substrate in a coating amount of 6.0 g/m², dried up and the thermally sensitive recording layer is prepared.

(2) Preparation of a Protecting Layer (Containing Ultra Violet Absorbing Agent)

| C solution (containing ultra violet absorbing agent) | |
|---|---|
| 2,2'-p-phenylenebis(4H-3,1-benzoxazin-4-one) | 3.0 parts |
| 10% aqueous solution of polyvinyl alcohol | 5.0 parts |
| water | 2.0 parts |

The mixture of above mentioned compounds is ground to average particles diameter of 1 $\mu$m by a sand grinder. Then the dispersions are mixed by following ratio and the coating is prepared.

| 10% aqueous solution of polyvinyl alcohol | 26.2 parts |
|---|---|
| aluminium hydroxide (50% aqueous (dispersion) | 6.0 parts |
| C solution | 10.0 parts |
| water for dilution | 48.1 parts |
| 25% aqueous solution of fluorescent dye | 0.1 parts |

The prepared coating is coated over the thermally sensitive recording layer to provide a coating amount of 3.0 g/m², dried up and treated by super calendar, then the thermally sensitive recording medium is obtained.

EXAMPLE 2

(1) Preparation of a Thermally Sensitive Recording Layer (Containing Ultra Violet Absorbing Agent)

| A solution (dispersion of color developer) | |
|---|---|
| 4-hydroxy-4'-isopropoxydiphenylsulfone | 6.0 parts |
| 10% aqueous solution of polyvinyl alcohol | 20.0 parts |
| water | 17.0 parts |

The mixture of above mentioned compounds is ground to average particles diameter of 1 $\mu$m by a sand grinder.

| B solution (dispersion of dye) | |
|---|---|
| 3-dibutylamino-6-methyl-7-anilinofluorane | 3.0 parts |
| 10% aqueous solution of polyvinyl alcohol | 5.0 parts |
| water | 2.0 parts |

The mixture of above mentioned compounds is ground to average particles diameter of 1 $\mu$m by a sand grinder.

| C solution (containing ultra violet absorbing agent) | |
|---|---|
| 2,2'-p-phenylenebis(4H-3,1-benzoxazin-4-one) | 3.0 parts |
| 10% aqueous solution of polyvinyl alcohol | 5.0 parts |
| water | 2.0 parts |

The mixture of above mentioned compounds is ground to average particles diameter of 1 $\mu$m by a sand grinder. Then the dispersions are mixed by following ratio and the coating is prepared.

| A solution | 430 parts |
|---|---|
| B solution | 10.0 parts |
| C solution | 10.0 parts |
| 30% aqueous dispersion of kaolin clay | 10.0 parts |

The prepared coating is coated over the one side surface of 50 g/m² substrate in a coating amount of 6.0 g/m², dried up and the thermally sensitive recording layer is prepared.

(2) Preparation of a Protecting Layer

The dispersions are mixed by following ratio and the coating is prepared.

| | |
|---|---|
| 10% aqueous solution of polyvinyl alcohol | 60.0 parts |
| aluminium hydroxide (50% aqueous solution) | 50.0 parts |
| zinc stearate | 10.0 parts |
| water for dilution | 50.0 parts |
| 25% aqueous solution of fluorescent dye | 0.5 parts |

The prepared coating is coated over the thermally sensitive recording layer in a coating amount of 3.0 g/m², dried up and treated by super calendar, then the thermally sensitive recording medium is obtained.

EXAMPLE 3

(1) Preparation of a Thermally Sensitive Recording Layer

| A solution (dispersion of color developer) | |
|---|---|
| 4-hydroxy-4'-isopropoxydiphenylsulfone | 6.0 parts |
| 10% aqueous solution of polyvinyl alcohol | 20.0 parts |
| water | 17.0 parts |

The mixture of above mentioned compounds is ground to average particles diameter of 1 μm by a sand grinder.

| B solution (dispersion of dye) | |
|---|---|
| 3-dibutylamino-6-methyl-7-anilinofluorane | 3.0 parts |
| 10% aqueous solution of polyvinyl alcohol | 5.0 parts |
| water | 2.0 parts |

The mixture of above mentioned compounds is ground to average particles diameter of 1 μm by a sand grinder. Then the dispersions are mixed by following ratio and the coating is prepared.

| | |
|---|---|
| A solution | 43.0 parts |
| B solution | 10.0 parts |
| 30% aqueous dispersion of kaolin clay | 10.0 parts |

The prepared coating is coated over the one side surface of 50 g/m² substrate in a coating amount of 6.0 g/m², dried up and the thermally sensitive recording layer is prepared.

(2) Preparation of an Intermediate Layer (Containing Ultra Violet Absorbing Agent)

The dispersions are mixed by following ratio and the coating is prepared.

| | |
|---|---|
| 2,2'-p-phenylenebis(4H-3,1-benzoxazin-4-one) | 3.0 parts |
| 10% aqueous solution of polyvinyl alcohol | 5.0 parts |
| water | 2.0 parts |

The mixture of above mentioned compounds is ground to average particles diameter of 1 μm by a sand grinder. The obtained coating is coated over the thermally sensitive recording layer as to make the coating amount be 3.0 g/m², dried up then the intermediate layer is formed.

(3) Preparation of Protecting Layer

| | |
|---|---|
| 10% aqueous solution of polyvinyl alcohol | 60.0 parts |
| aluminium hydroxide (50% aqueous solution) | 50.0 parts |
| zinc stearate | 10.0 parts |
| water for dilution | 50.0 parts |
| 25% aqueous solution of fluorescent dye | 0.5 parts |

The prepared coating is coated over the thermally sensitive recording layer as to the coating amount be 3.0 g/m², dried up and treated by super calendar, then the thermally sensitive recording medium is obtained.

EXAMPLE 4

The thermally sensitive recording medium is prepared by same procedure to Example 1 except using 2,2'-p-phenylenebis(4H-6-chloro-3,1-benzoxazin-4-one) instead of said ultra violet ray absorbing agent.

EXAMPLE 5

The thermally sensitive recording medium is prepared by same procedure to Example 1 except using 2,2'-p-phenylenebis(4H-7-chloro-3,1-benzoxazin-4-one) instead of said ultra violet ray absorbing agent.

EXAMPLE 6

The thermally sensitive recording medium is prepared by same procedure to Example 1 except using 2,2'-p-phenylenebis(4H-6-methyl-3,1-benzoxazin-4-one) instead of said ultra violet ray absorbing agent.

EXAMPLE 7

The thermally sensitive recording medium is prepared by same procedure to Example 1 except using 2,2'-p-phenylenebis(4H-6-acetoxy-3,1-benzoxazin-4-one) instead of said ultra violet ray absorbing agent.

EXAMPLE 8

The thermally sensitive recording medium is prepared by same procedure to Example 1 except using 2,2'-p-phenylenebis(4H-6-bromo-3,1-benzoxazin-4-one) instead of said ultra violet ray absorbing agent.

EXAMPLE 9

The thermally sensitive recording medium is prepared by same procedure to Example 1 except using 2,2'-p-phenylenebis(4H-6-iodo-3,1-benzoxazin-4-one) instead of said ultra violet ray absorbing agent.

EXAMPLE 10

The thermally sensitive recording medium is prepared by same procedure to Example 1 except using 2,2'-p-phenylenebis(4H-7-nitro-3,1-benzoxazin-4-one) instead of said ultra violet ray absorbing agent.

EXAMPLE 11

The thermally sensitive recording medium is prepared by same procedure to Example 1 except using 2,2'-p-phenylenebis(4H-6,-carboxy-3,1-benzoxazin-4-one) instead of said ultra violet ray absorbing agent.

EXAMPLE 12

The thermally sensitive recording medium is prepared by same procedure to Example 1 except using 2,2'-(4,4'- biphenylene)bis(4H-3,1-benzoxazin-4-one) instead of said ultra violet ray absorbing agent.

Comparative Example 1

The thermally sensitive recording medium is prepared by same procedure to Example 1 without using said ultra violet ray absorbing agent.

Comparative Example 2

The thermally sensitive recording medium is prepared by same procedure to Example 1 except using 2,2'-methylenebis[6-(2H-benzotriazol-2-yl)-4-(1,1,3,3-tetramethylbutylphenol) which is a conventional ultra violet absorbing agent instead of said ultra violet ray absorbing agent.

The quality and ability measurements are carried out on the specimen obtained in above mentioned Examples and Comparative Examples. The results are summarized in Table.1.

(1) Color developing ability: The density of image recorded by UBI Easy Coder 201 IIE (product of UBI Co., Ltd.) 0.26 mj/dot is measured by Machbeth density meter umber filter.

(2) Light resistance: Thermally sensitive recording medium printed by said condition is treated by Xenon lamp weather meter for 24 hours, then the density of recording part and ground part are measured by Machbeth density meter umber filter. (radiate illumination intensity : 67 W/m², integrating radiate illumination intensity: 5348 kj/m²)

(3) Fine refuse stuck to head: The stain of thermal head after printed by UBI EasyCoder 201 IIE (product of UBI Co., Ltd.) 0.41 mj/dot is evaluated by naked eye of the inspector.

Evaluation Standard
⊙: no refuse is observed
○: small amount of refuse are observed, but negligible
X: many refuse are observed

TABLE 1

| Specimen | before test | | after test | | refuse stuck to head |
| --- | --- | --- | --- | --- | --- |
| | color developed part | ground part | color developed part | ground part | |
| Example 1 | 1.46 | 0.09 | 1.32 | 0.10 | ⊙ |
| Example 2 | 1.50 | 0.09 | 1.37 | 0.11 | ⊙ |
| Example 3 | 1.48 | 0.09 | 1.38 | 0.10 | ⊙ |
| Example 4 | 1.29 | 0.09 | 1.26 | 0.11 | ⊙ |
| Example 5 | 1.41 | 0.09 | 1.29 | 0.11 | ⊙ |
| Example 6 | 1.37 | 0.09 | 1.30 | 0.09 | ⊙ |
| Example 7 | 1.51 | 0.09 | 1.39 | 0.09 | ⊙ |
| Example 8 | 1.39 | 0.09 | 1.30 | 0.15 | ⊙ |
| Example 9 | 1.29 | 0.09 | 1.17 | 0.09 | ⊙ |
| Example 10 | 1.23 | 0.09 | 1.21 | 0.09 | ⊙ |
| Example 11 | 1.49 | 0.09 | 1.35 | 0.11 | ⊙ |
| Example 12 | 1.49 | 0.09 | 1.32 | 0.09 | ⊙ |
| Co. Expl. 1 | 1.50 | 0.10 | 1.20 | 0.24 | ⊙ |
| Co. Expl. 2 | 1.49 | 0.10 | 1.35 | 0.13 | X |

Effect of the Invention

The thermally sensitive recording medium which uses benzoxadinone compound represented by general formula (1) of this invention has a good light resistance of recording part and ground part, does not change color even if exposed to the sun light or to the high temperature atmosphere for long time and the appearance is not hurt. Further, since the sticking of head refuse at recording action is controlled, the runnability is good. Furthermore, since it has a good image preserving ability such as resistance to plasticizer, it can be said to be a very useful thermal sensitive recording medium.

What is claimed is:

1. In a thermally sensitive recording medium supported on a substrate wherein a color image is formed from the chemical reaction between an electron donating compound and an electron accepting compound, the improvement comprising including in said medium, fine divided particles of at least one benzoxadinone compound of formula (1)

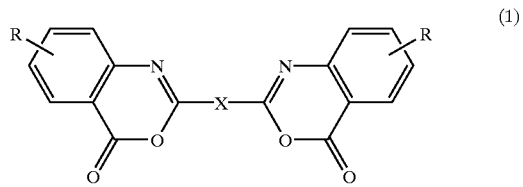

wherein R represents hydrogen atom, hydroxyl group, alkyl group of carbon number 1–8, alkoxy group of carbon number 1–6, acyl group of carbon number 1–6, acyloxy group of carbon number 1–6, alkoxy carbonyl group of carbon number 1–6, carboxyl group, halogen atom or nitro group and X represents a divalent group or a direct bond.

2. The thermally sensitive recording medium according to claim 1, which comprises 1 to 50% by weight, based on the total weight of the recording medium, of said finely divided particles.

3. The thermally sensitive recording medium according to claim 1, wherein said medium comprises from 10 to 40 weight percent, based on the weight of the recording medium, of finely divided particles of benzoxadinone compound of formula (1).

4. The thermally sensitive recording medium according to claim 1, wherein the particles of benxozadinone compound of formula (1) have an average particle size smaller than 2 μm.

5. The thermally sensitive recording medium according to claim 1, wherein the particles of benxozadinone compound of formula (1) have an average particle size smaller than 0.5 μm.

6. The thermally sensitive recording medium according to claim 1, wherein said member comprises a thermally sensitive recording layer supported by said substrate, and a protective layer supported by said thermally sensitive layer, wherein said electron donating compound and said electron accepting compound are dispersed in said recording layer and the finely divided particles of benzoxadinone compound of formula (1) are dispersed in said protective layer.

7. The thermally sensitive recording medium according to claim 1, wherein the benzoxadinone compound of formula (1) is 2,2'-p-phenylenebis(4H-3,1-benzoxazin-4-one).

8. The thermally sensitive recording medium according to claim 1, wherein the benzoxadinone compound of formula (1) is present in a layer comprising the compound of formula (1) and a binder, wherein the binder is polyvinyl alcohol.

* * * * *